(12) United States Patent
Tolgu et al.

(10) Patent No.: US 7,681,117 B2
(45) Date of Patent: Mar. 16, 2010

(54) GRID ENTRY USER INTERFACE EXTENSIONS

(75) Inventors: Karl E. Tolgu, Seattle, WA (US); Michael K. Forney, Bainbridge Island, WA (US)

(73) Assignee: Microsoft Corporation, Redmond, WA (US)

( * ) Notice: Subject to any disclaimer, the term of this patent is extended or adjusted under 35 U.S.C. 154(b) by 1121 days.

(21) Appl. No.: 11/291,416

(22) Filed: Dec. 1, 2005

(65) Prior Publication Data

US 2007/0130502 A1 Jun. 7, 2007

(51) Int. Cl.
*G06F 17/00* (2006.01)

(52) U.S. Cl. .................... 715/212; 715/229

(58) Field of Classification Search .......... 715/503, 715/212
See application file for complete search history.

(56) References Cited

U.S. PATENT DOCUMENTS

2005/0015379 A1* 1/2005 Aureglia et al. ............. 707/100
2006/0031849 A1* 2/2006 Barta et al. .................. 719/320

* cited by examiner

*Primary Examiner*—Doug Hutton
*Assistant Examiner*—Tionna Smith
(74) *Attorney, Agent, or Firm*—Joseph R. Kelly; Westman, Champlin & Kelly, P.A.

(57) ABSTRACT

A computer-readable medium has computer-executable instructions for generating a user interface on a display device, the user interface includes a grid having a plurality of cells. The user interface also includes a visual affordance presented on the grid and visually connected to one of the plurality of cells, the visual affordance exposing properties of the one of the plurality of cells to which it is visually connected.

19 Claims, 7 Drawing Sheets

| Totals: | M 1/1 | T 1/2 | W 1/3 | Th 1/4 | F 1/5 | Sa 1/6 | Su 1/7 | 33.00 |
|---|---|---|---|---|---|---|---|---|
| HOTELEDGER: Park Resort Hotel Ledger | | | | | | | Totals | |
| CONSULTING: Consulting Fe STD | 8.00 | | 8.00 | 8.00 | 1.00 | | | 8.00 |
| DESIGN: Product Design STD | | 8.00 | | | | | | 8.00 |
| | | Tues 1/2/05 - HOTELEGER - Product Design | | | | | | |
| | | Edit 4.00 Standard, Engineering, Engineer Level 2, Salary Pay Code | | | | | | |
| | | Edit 4.00 OT, Engineering, Engineer Level 2, Salary Pay Code | | | | | | |
| | | Add | | | | | | |
| MANAGEMENT: Project Ma... STD | | 8.00 | | | | | | 8.00 |
| REVIEW: Design Reviews STD | | | 8.00 | | 1.00 | | | 9.00 |

FIG. 4

GRID ENTRY USER INTERFACE EXTENSIONS

BACKGROUND

Currently in data entry applications, two-dimensional grids having cells are often used. For example grid level entry of data, for items like time entry, can be easiest to understand when presented in an X-Y grid where columns conform to dates and rows conform to tasks or subjects. This metaphor relies heavily on existing use of a standard calendar format, and currently is a widely used user interface (UI) format for time entry. Similar X-Y grid formats are frequently used in other data entry applications as well.

However, in many systems more information can or must be associated with some or all of the cells of a grid. Using the time entry example, information which may need to be associated with a particular time entry cell could include overtime rates, location, billable or non-billable categories of the time entry, comments, and other variations. As a further example, in some cases start and stop time needs to be recorded for a task/day cell. Currently, this information is often represented in or linked to the cell using icons and additional dialogs to indicate these fields. These techniques have a tendency to overload the cell in some instances. Using dialogs, typically in the form of dialog boxes which pop up and float (are moveable) on the display screen, is especially problematic as it takes the user out of the context of the grid to present additional fields to manipulate.

The discussion above is merely provided for general background information and is not intended to be used as an aid in determining the scope of the claimed subject matter.

SUMMARY

In some embodiments, a user interface includes a grid having a plurality of cells. The user interface also includes a visual affordance presented on the grid and visually connected to one of the cells. The visual affordance exposes properties of the cell to which it is visually connected.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

FIGS. 3-1 through 3-5 are diagrammatic illustrations of cell extension embodiments.

FIG. 4 is a screen shot illustrating features of an example user interface embodiment.

FIGS. 5 and 6 are flow diagrams illustrating method embodiments.

DETAILED DESCRIPTION

Figure 1:
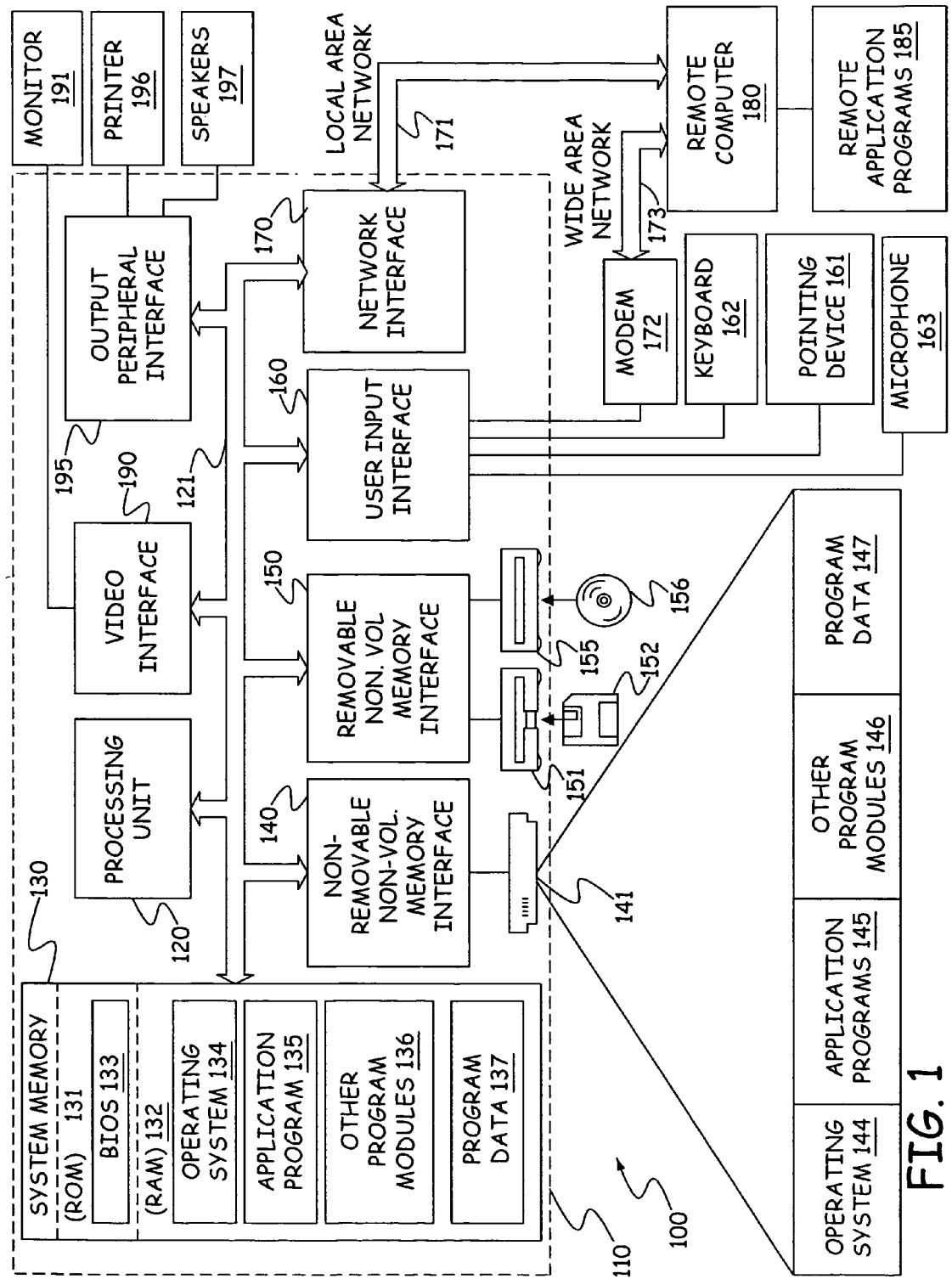
FIG. 1 is a block diagram of a one computing environment in which some embodiments may be practiced.

Disclosed embodiments include user interfaces (UIs) employing grids for data entry and other purposes. The user interfaces include visual affordances presented in the grids that extend the functionality provided in cells of the grid without leaving the grid itself as is currently common with the use of pop-up dialog boxes. These visual affordances can be in the form or extensions to cells of the grid, and can be referred to as submarines, cell extensions, and visual extensions. The user interfaces can be implemented using computer-implemented methods in a variety of computing environments, including personal computers, server computers, hand-held computing devices, etc. Before describing the embodiments in greater detail, a discussion of an example computing environment in which the embodiments can be implemented may be useful. FIG. 1 illustrates one such computing environment which can represent any of these different types of computing environments.

FIG. 1 illustrates an example of a suitable computing system environment 100 on which one or more aspects of embodiments may be implemented. The computing system environment 100 is only one example of a suitable computing environment and is not intended to suggest any limitation as to the scope of use or functionality of the illustrated embodiments. Neither should the computing environment 100 be interpreted as having any dependency or requirement relating to any one or combination of components illustrated in the exemplary operating environment 100.

The illustrated embodiments are operational with numerous other general purpose or special purpose computing system environments or configurations. Examples of well-known computing systems, environments, and/or configurations that may be suitable for use with the illustrated embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

The illustrated embodiments may be described in the general context of computer-executable instructions, such as program modules, being executed by a computer. Generally, program modules include routines, programs, objects, components, data structures, etc. that perform particular tasks or implement particular abstract data types. The illustrated embodiments may also be practiced in distributed computing environments where tasks are performed by remote processing devices that are linked through a communication network. In a distributed computing environment, program modules may be located in both local and remote computer storage media including memory storage devices. Tasks performed by the programs and modules are described below and with the aid of figures. Those skilled in the art can implement the description and figures provided herein as processor executable instructions, which can be written on any form of a computer readable medium.

With reference to FIG. 1, an exemplary system includes a general-purpose computing device in the form of a computer 110. Components of computer 110 may include, but are not limited to, a processing unit 120, a system memory 130, and a system bus 121 that couples various system components including the system memory to the processing unit. System bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies.

A user may enter commands and information into the computer 110 through input devices such as a keyboard 162, a microphone 163, and a pointing device 161, such as a mouse, trackball or touch pad. Other input devices (not shown) may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 is operated in a networked environment using logical connections to one or more remote computers, such as a remote computer 180. The remote computer 180 may be a personal computer, a hand-held device, a server, a router, a network PC, a peer device or other common network node, and typically includes many or all of the elements described above relative to the computer 110. The logical connections depicted in FIG. 1 include a local area network (LAN) 171 and a wide area network (WAN) 173, but may also include other networks. Such networking environments are commonplace in offices, enterprise-wide computer networks, Intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on remote computer 180. It will be appreciated that the network connections shown are exemplary and other means of establishing a communications link between the computers may be used.

Figure 2:
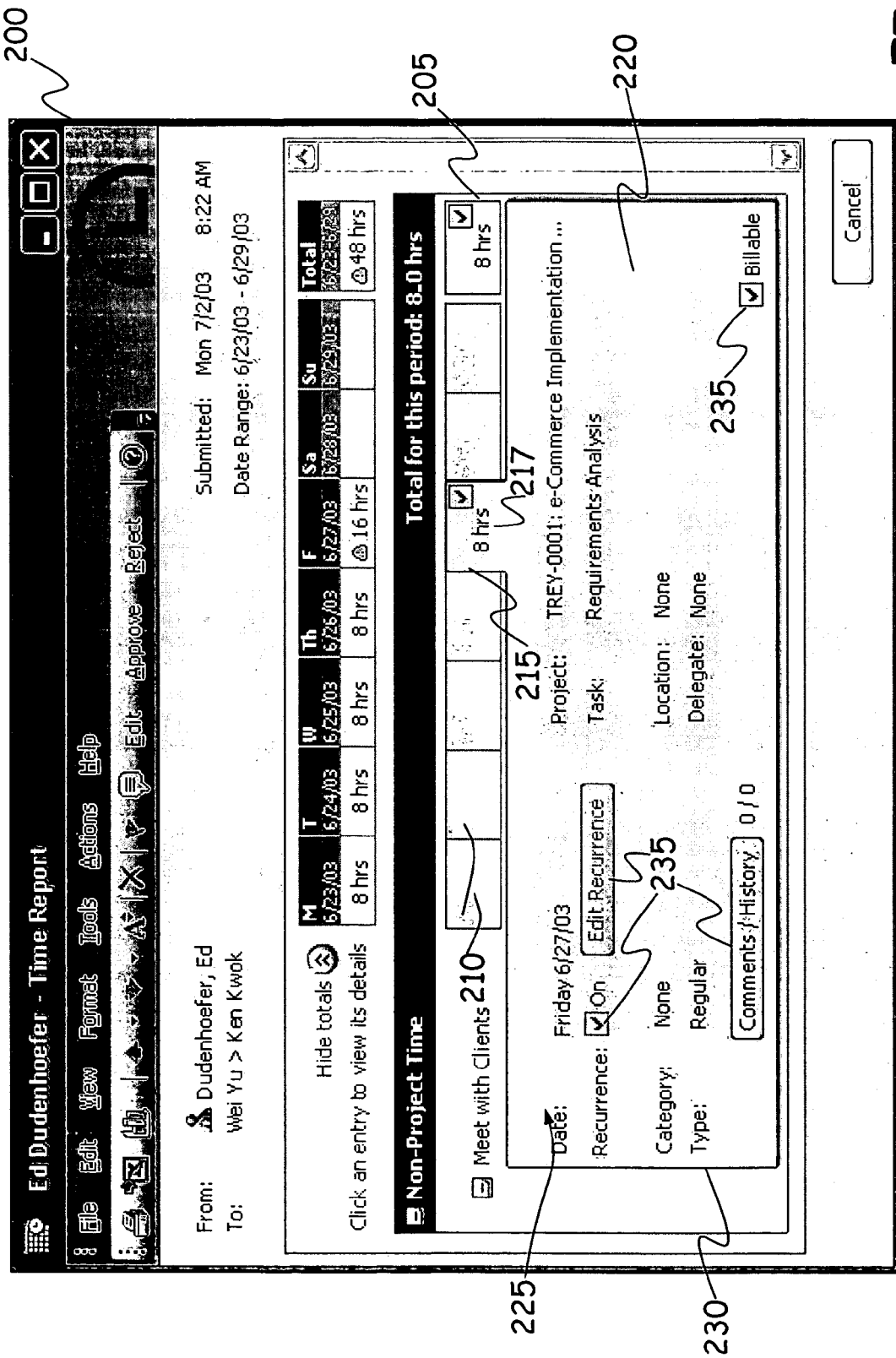
FIG. 2 is a screen shot of an example user interface embodiment.

Referring now to FIG. 2, shown is a screen shot of an example user interface 200 of a type which can be displayed on a display device such as monitor 191 shown in FIG. 1. The user interface 200 includes a grid 205 having multiple cells 210. In FIG. 2, one of the cells 210 has been selected, and this cell is designated at reference number 215. Also included in user interface 200 is a visual affordance or cell extension 220 presented on the grid. The cell extension is visually connected, for example using a rendered border 230, to selected cell 215. The border 230 is visually distinguishable from other grid lines and surrounds both the cell extension 220 and the selected cell 215 to which cell extension 220 is connected, thereby providing the visual connection between the two. Cell extension 220 exposes properties or information 225 relating to the data, contents or format of selected cell 215. For example, in FIG. 2 the properties or information 225 displayed in cell extension 220 relate to the data 217 displayed in cell 215. As will be described below in greater detail, user interface 200 can also include control elements 235 of various types displayed in cell extension 220. The control elements (or just "controls") 235 can be used to configure the displayed contents of cell extension 220.

Figures 1, 3:
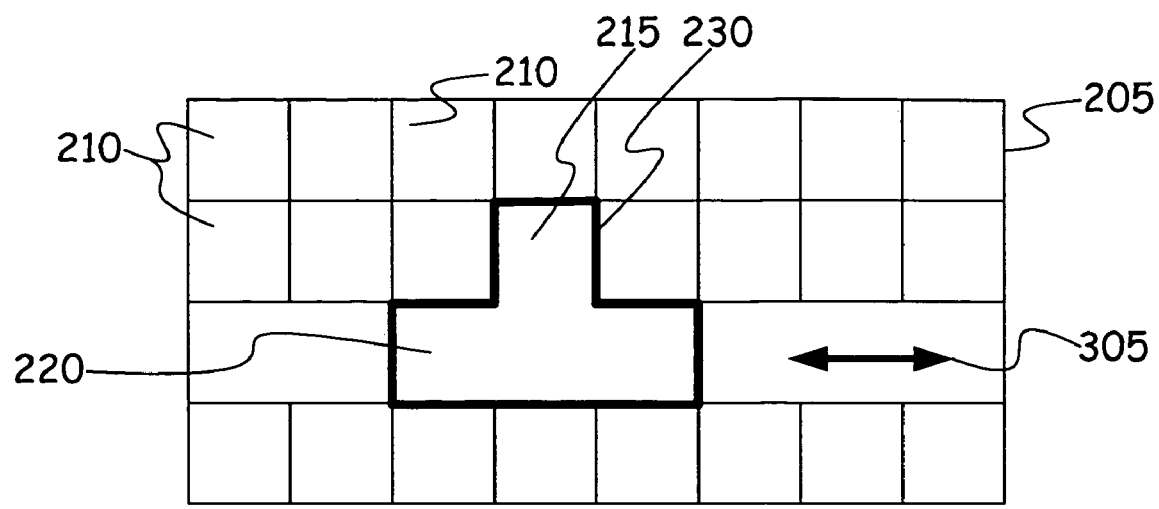
Figures 2, 3:
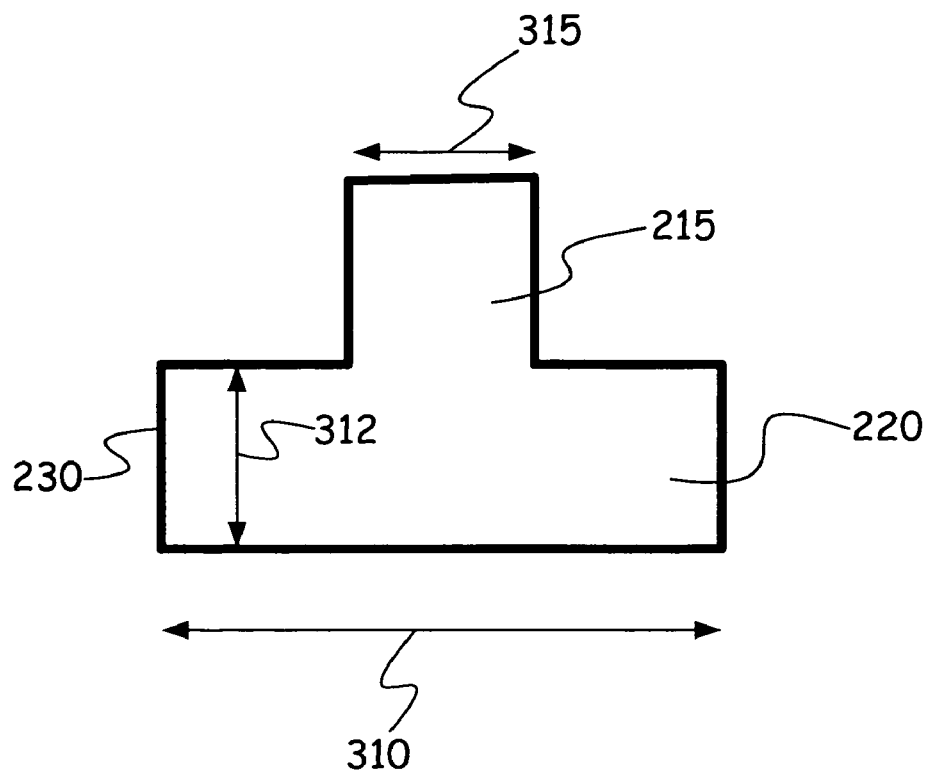
Figure 3:
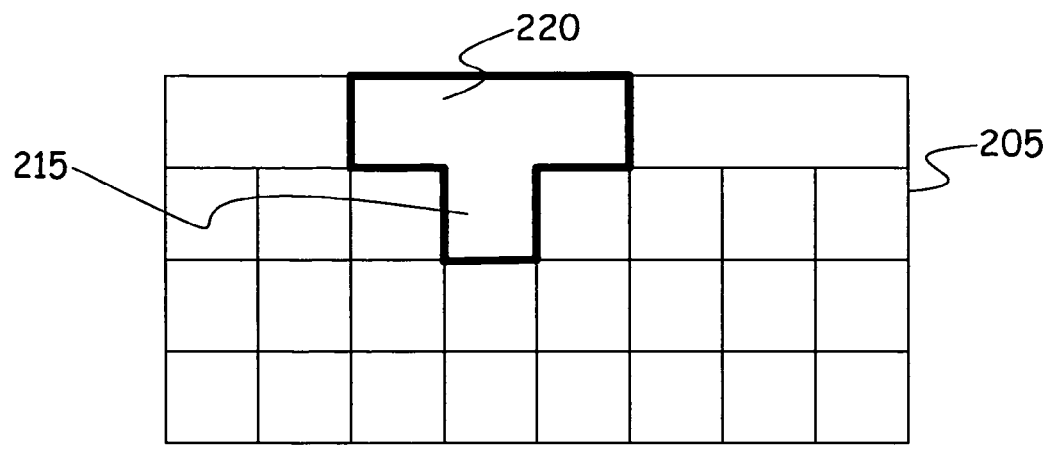

Referring now to FIGS. 3-1 through 3-5, shown are diagrammatic illustrations of example features of the disclosed user interfaces. As can be seen in FIG. 3-1, in some embodiments cell extension 220 is positioned below selected cell 215. The shape of border 230 thus resembles the shape of a submarine, and for this reason cell extension 220 is sometimes referred to, alone or in combination with cell 215, as a submarine. The cell extension width 310 and height 312 (shown in FIG. 3-2) can vary as desired, but generally will be limited by the viewable grid region. As represented in FIG. 3-1 using arrow 305, when the user interface is controlled to scroll horizontally across the screen of a display device, the cell extension 220 can travel the width of the grid scrolling region, remaining visually connected to cell 215 as the position of cell 215 changes on the screen. Other features relating to the movement of cell extension 220 are described later in greater detail.

Figures 3, 4:
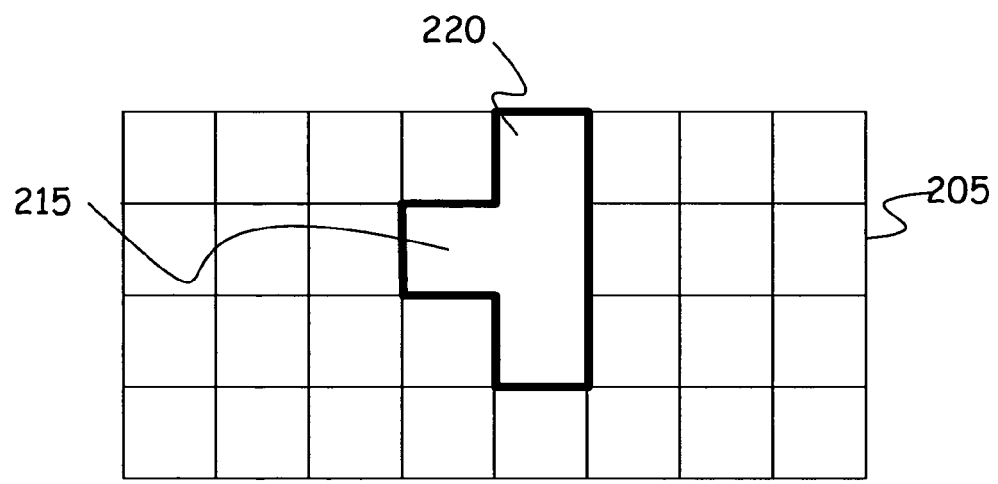
Figures 3, 4, 5:
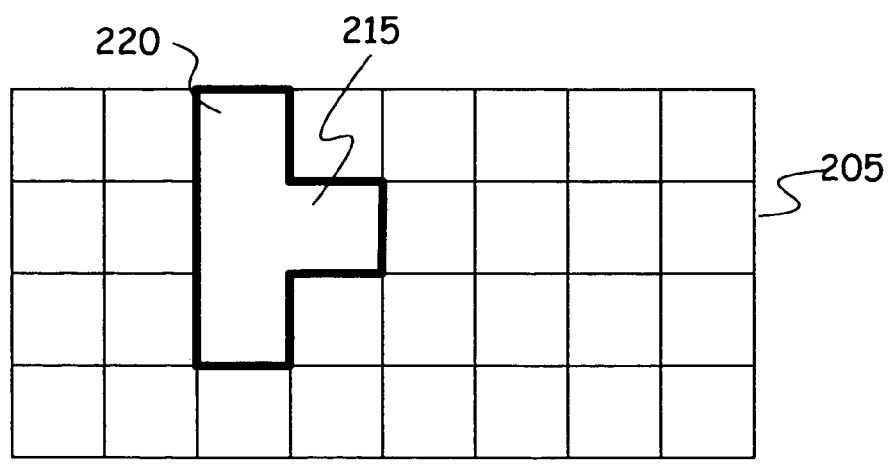
Figure 5:
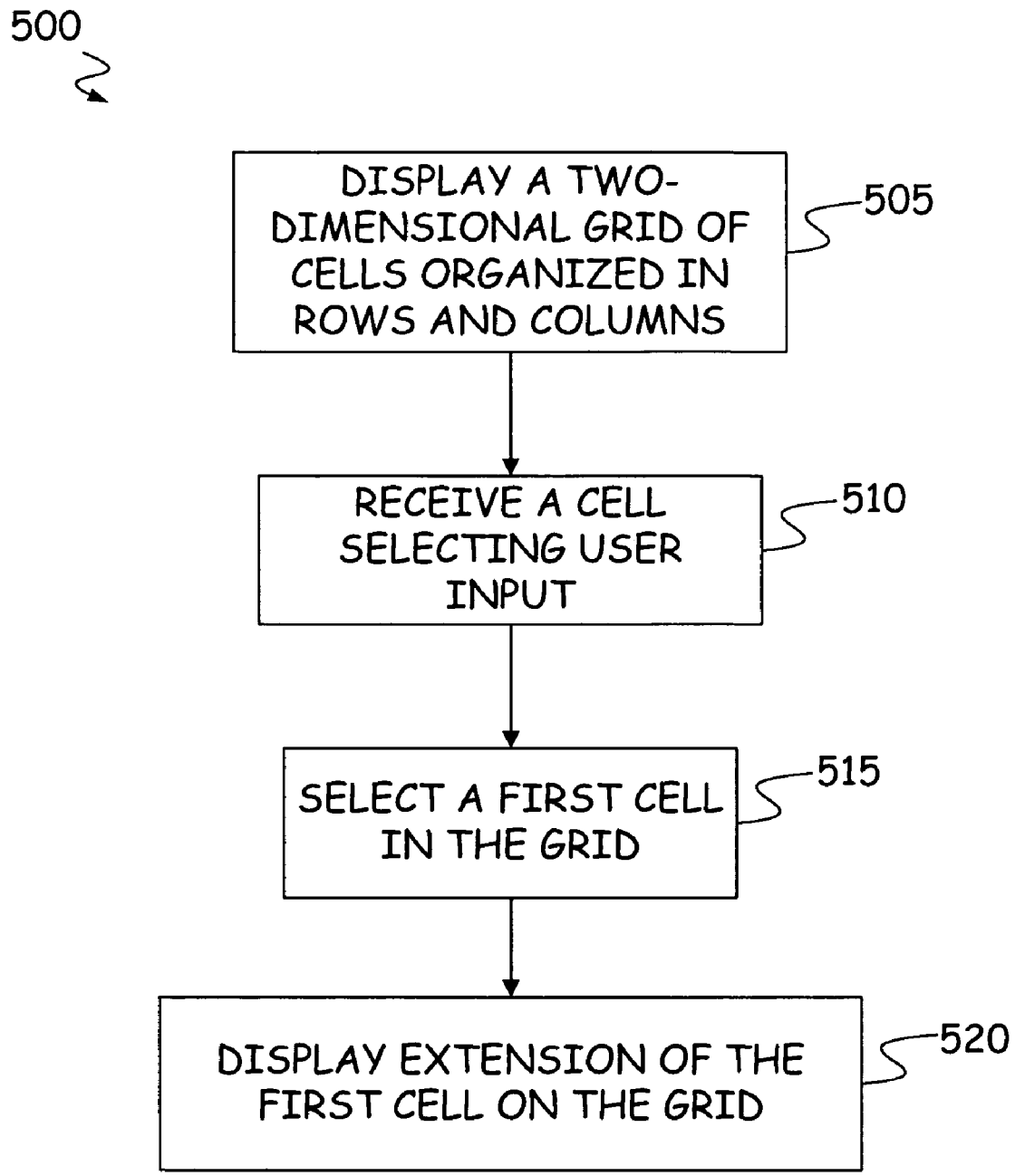

As shown in FIG. 3-2, in some embodiments, the width 310 of cell extension 220 will be greater than the width of cell 215 to which it is visually connected. This allows room for the properties or information relating to cell 215 to be displayed. While in some embodiments cell extension 220 is positioned entirely below (or above, beside, etc) the cell 215 to which it is visually connected, this need not be the case in all embodiments. Further, while example embodiments are frequently illustrated and described with reference to the cell extension being positioned below the cell to which it is connected, this also need not be the case. FIGS. 3-3 through 3-5 provide diagrammatic illustrations of alternative embodiments in which the cell extensions 220 are positioned above and on the right and left hand sides of the cell 215. Note that in the embodiments illustrated in FIGS. 3-4 and 3-5, the cell extension 220 can have its longer dimension extend vertically, cover cells in one or more rows adjacent to cell 215.

Referring now to FIG. 4, shown is another embodiment of user interface 200 which illustrates additional features of some disclosed embodiments. In accordance with some embodiments, the functionality provided by cell extension user interface 200 can be described as follows. The cell extension 220 can be used to either access properties for cell 215 or for a row 402 of which cell 215 is a member, or to allow multiple numeric entries (represented at 225-1) to be made against the same task, date, etc displayed in cell 215.

In some embodiments, when multiple numbers 225-1 are rendered within cell extension 220, corresponding to a sum (represented as data 217) in cell 215, the sum number rendered in cell 215 is automatically bolded or otherwise visually distinguished to indicate that number is a sum. Another feature of some user interface embodiments is that, with the selected or highlighted cell 215 visually connected to the body of the cell extension 220, the orientation is such that the columns line up when possible. In other words, when appropriate the data in cell extension 220 is laterally aligned with the data in cell 215. This is particularly applicable to embodiments in which the data 217 in cell 215 is a sum of properties or information (e.g., in the form of component data) in cell extension 220.

Using control elements 235 rendered or displayed in cell extension 220, a user or administrator can configure tasks. In the example illustrated in FIG. 4, edit control elements 235-1 are rendered in cell extension 220 in order to edit the descriptions or otherwise configure data fields included in the cell extension. Also in the example embodiment, add control element 235-2 is rendered in cell extension 220 to allow a user to add task variants. For example, the user can configure cell extension 220 to host multiple task variants like overtime, billable vs. non-billable hours, hours with specific notes, etc. The user can also add additional variants if the system has been configured to allow it. In some embodiments, the administrator can allow users to only add variants as a set or subset from a master list. The particular task variants mentioned are provided as examples only, and disclosed embodiments are not limited to these examples.

Interacting with a grid 205 of a user interface 200 in accordance with some disclosed embodiments can be a relatively seamless heads down data entry model. Cells 210 can be oriented to "default" task properties, and as such should not need to show cell extensions 220 unless there is a delta that needs to be tracked. To open and close a cell extension for a cell, an operator can use a keyboard shortcut (for example control+Plus) to open the cell extension and a keyboard shortcut (for example control+minus) to collapse it. In some embodiments, the user has the alternate choice of clicking the visual cell extension enabling control element 405 (e.g., the +/− on the Task/Row level). Also in some embodiments, cells that require the cell extension will open the extension when the user clicks the cell or the cell is in focus to support mouse-less data entry. This occurs when cells already have data entered in variants from the default, or if the administrator has configured the system with pre-populated variants and requires specificity in data entry. In some embodiments, the entire task/row can be forced to show the cell extension 220 either when the administrator sets the task entry preferences, or when the user clicks the control element 505.

As mentioned previously, the cell extension 220 can move on the user interface in several different manners. In some embodiments, when the cell extension 220 is activated using control element 405, the cell extension 220 moves under the bottom grid line of the row 402, always maintaining contact and therefore context with the cell 215 it operates upon. For regions that are close to the beginning or end of the grid the body of the cell extension maintains its furthermost orientation while the cell highlight moves along the line. In some horizontally scrolling views, the cell extension will always be in focus, but the window will not scroll until the next position is invoked. In some of these example embodiments, when the window does scroll, every attempt to center the submarine is made to avoid scrolling for as many horizontal cell selections as possible. For vertical movement, in some embodiments the cell extension 220 will always be displayed in the visible grid area and never scrolled below the fold—except in extreme parent window scaling scenarios. Focus moves to the body of the submarine when the parent grid cell is selected.

Referring now to FIG. 5, shown is a flow diagram 500 illustrating a method of displaying information in accordance with some embodiments as described above. As shown in FIG. 5, the method includes the step 505 of displaying a two-dimensional grid 205 of cells 210 organized in rows and columns. The method also includes the step 510 of receiving a cell selecting user input. As described, this can be in a variety of forms, including a click on the cell to be selected, for example. In response to the cell selecting user input, a first cell 215 in the grid is selected as shown at step 515. Then, as shown at step 520, the method includes the step of displaying a visual extension 220 of the first cell 215 on the grid 205.

As described above in detail, the step 520 of displaying the visual extension 220 of the first cell 215 in response to the user input can include displaying the visual extension in the form of a display area on the grid 205 which is visually connected to the first cell 215. Also, as described, in performing this step, in some embodiments a border 230 will be displayed around the extension 220 and the first cell 215. Frequently, this step will also result in the cell extension 220 having a greater width 310 than a width of the selected first cell 215. Also in some embodiments as described above, step 520 can result in displaying data 225-1 in the visual extension 220 such that the data in the visual extension is laterally aligned with data 217 in the first cell 215 to form a column. The cell extension can also display other property information 225 related to the first cell 215 in the extension. Other features which can be displayed in the visual cell extension include, as described above, control elements 235 which allows a user to configure the property information.

Figure 6:
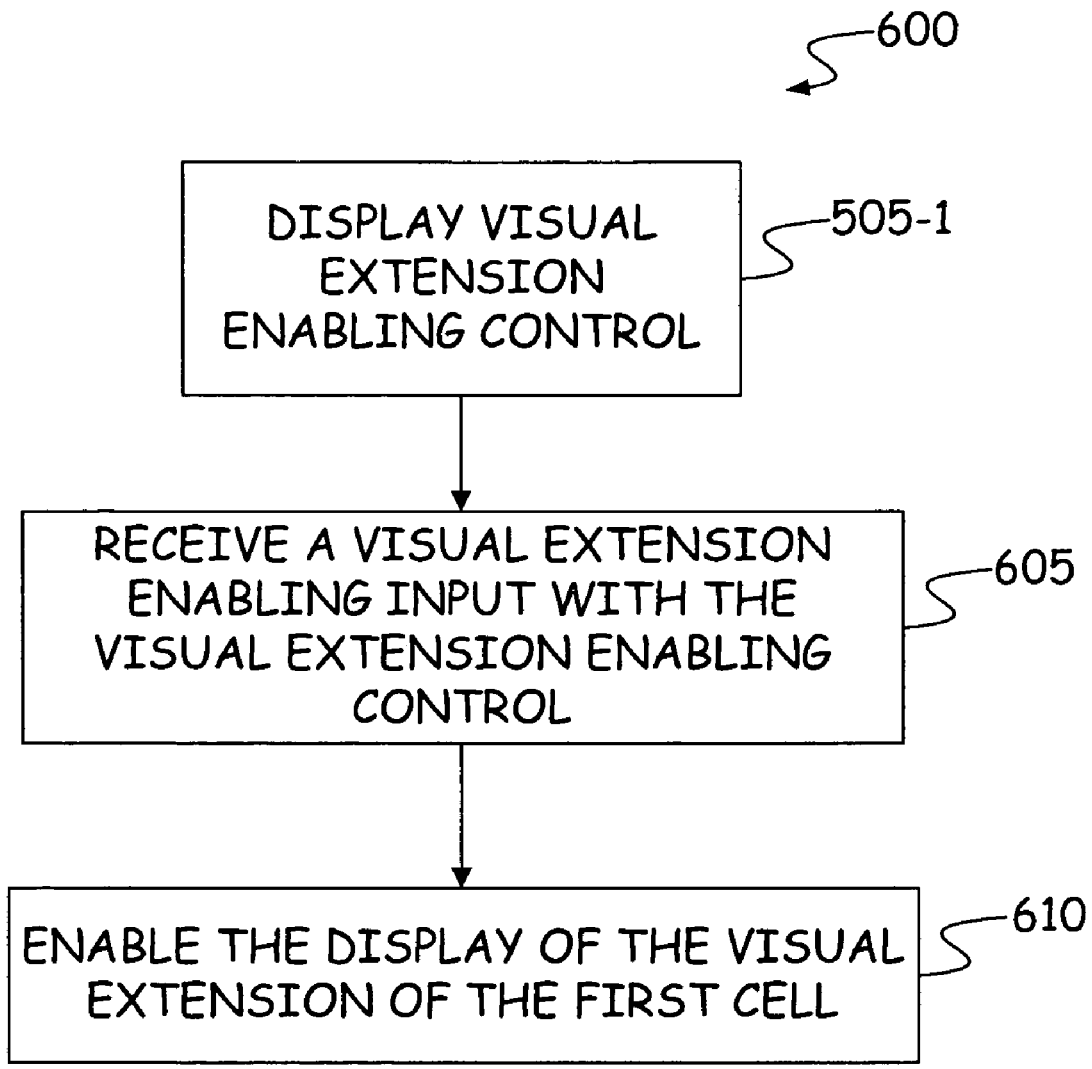

Referring now to FIG. 6, shown in flow diagram 600 are additional steps for some method embodiments. As can be seen at step 505-1, the step 505 shown in FIG. 5 of displaying the two-dimensional grid of cells can further include displaying a visual extension enabling control 405. Then, as shown at step 605, the method further includes the step of receiving a visual cell extension enabling input with the visual extension enabling control 405. At step 610, in response to the receipt of the extension enabling input in step 605, the method includes enabling the display of the cell extension of the first cell.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computer-readable storage medium having computer-executable instructions for generating a user interface on a display device, using a computer, having a processor, that executes the computer-executable instructions, the user interface comprising:
    a grid, displayed using the processor, having a plurality of cells arranged in a plurality of aligned rows and columns, the cells in each of the plurality of rows in the grid being aligned with one another horizontally and the cells in each of the plurality of columns being aligned with one another vertically, each cell in the grid having a visual border that distinguishes it, visually, from the other cells in the grid; and
    a visual affordance presented on the grid, using the processor, and visually connected to a selected one of the plurality of cells, the visual affordance exposing properties of the selected one of the plurality of cells to which it is visually connected, the visual affordance having a border that is only displayed when the selected one of the cells is selected, the border having a cell portion that coincides with part of the visual border of the selected one of the plurality of cells and an extension portion that extends around a remainder of the visual affordance to visually indicate that the selected one of the plurality of cells is part of the visual affordance, the visual affordance being different from, and displayed over, a plurality of cells in the grid, other than the selected one of the plurality of cells.

2. The computer-readable storage medium of claim 1, wherein the visual affordance is a visual extension of the selected one of the plurality of cells to which it is visually connected.

3. The computer-readable storage medium of claim 2, wherein the visual extension of the selected one of the plurality of cells to which it is visually connected has a width which is wider than the selected one of the plurality of cells to which it is visually connected.

4. The computer-readable storage medium of claim 3, wherein the visual extension is positioned at least partially below the selected one of the plurality of cells to which it is visually connected.

5. The computer-readable storage medium of claim 2, wherein the user interface further comprises a control element in the visual extension which allows a user to configure displayed contents of the extension.

6. The computer-readable storage medium of claim 2, wherein the user interface automatically displays the visual extension when the selected one of the plurality of cells is selected and a number rendered in the selected one of the plurality of cells is a sum of other numbers, and wherein the other numbers are rendered in the visual extension.

7. A computer-implemented method of displaying information using a computer with a processor, the method comprising:
    displaying, with the processor, a two-dimensional grid of cells organized in aligned rows and columns, each cell in the grid having a visual border that visually distinguishes it from other cells in the grid;
    receiving, with the processor, a cell selecting user input;
    selecting a first cell in the grid of cells based upon the cell selecting user input; and
    displaying a visual extension of the first cell on the grid, the visual extension having a border that is only displayed when the first cell is selected, the border having a cell portion that coincides with part of the visual border of the first cell and an extension portion that extends around the remainder of the visual extension to visually indicate that the first cell is part of the visual extension, the visual extension being different from, and displayed over, a plurality of cells in the grid, other than the first cell.

8. The computer-implemented method of claim 7, wherein displaying the visual extension of the first cell in response to the user input further comprises displaying the visual extension in the form of a display area on the grid which is visually connected to the first cell.

9. The computer-implemented method of claim 8, wherein displaying the visual extension of the first cell further comprises displaying property information related to the first cell in the visual extension.

10. The computer-implemented method of claim 9, wherein displaying the visual extension of the first cell further comprises displaying a control element in the visual extension which allows a user to configure the property information.

11. The computer-implemented method of claim 8, wherein displaying the two-dimensional grid of cells further comprises displaying a visual extension enabling control, the method further comprising:
    receiving a visual extension enabling input with the visual extension enabling control; and
    enabling the display of the visual extension of the first cell in response to the receipt of the visual extension enabling input.

12. The computer-implemented method of claim 8, and wherein displaying the visual extension of the first cell further comprises displaying a border around the visual extension and the first cell.

13. The computer-implemented method of claim 8, wherein displaying the visual extension of the first cell further comprises displaying data in the visual extension such that the data in the visual extension is laterally aligned with data in the first cell to form a column.

14. The computer-implemented method of claim 8, wherein displaying the visual extension of the first cell further comprises displaying the visual extension such that it has a width which is wider than a width of the first cell.

15. The computer-implemented method of claim 14, wherein displaying the visual extension of the first cell further comprises displaying the visual extension such that the visual extension is positioned at least partially below the first cell.

16. A computer-readable storage medium having computer-executable instructions for generating with a computer having a processor, a user interface on a display device, the user interface comprising:
   a grid, displayed by the processor on the display device, having a plurality of cells;
   a cell extension visually connected to a first cell of the plurality of cells, the cell extension having a visual border that is displayed by the processor on the display device only when the first cell is selected;
   the visual border surrounding the first cell and the cell extension and having a portion thereof overlying a portion of a visual border of the first cell to indicate that the first cell is a part of the cell extension, the cell extension being displayed over, and covering, other cells in the grid;
   data displayed in the first cell; and
   information, related to the data displayed in the first cell, displayed in the cell extension.

17. The computer-readable storage medium of claim 16, wherein the cell extension has at least one of a height and a width which is greater than a corresponding one of a height and width of the first cell.

18. The computer-readable storage medium of claim 16, wherein the user interface further comprises a control element displayed in the cell extension which allows a user to configure the information displayed in the cell extension.

19. The computer-readable storage medium of claim 16, wherein the user interface further comprises a cell extension enabling control element which allows a user to enable and disable display of the cell extension.

* * * * *